United States Patent [19]

Kaplan

[11] Patent Number: 4,570,891
[45] Date of Patent: Feb. 18, 1986

[54] FLIP TOGGLE ANCHORING DEVICE

[76] Inventor: Stanley Kaplan, c/o Universal Fastenings, 45 Gilpin Ave., Hauppauge, N.Y. 11788

[21] Appl. No.: 488,146

[22] Filed: Apr. 24, 1983

[51] Int. Cl.⁴ .................... F16B 13/04; B42F 13/00
[52] U.S. Cl. .................... 248/341; 411/346; 411/389; 411/392; 411/424
[58] Field of Search .................... 411/15, 340, 341, 342, 411/343, 344, 345, 346, 388, 389, 411, 424, 392; 248/339, 341

[56] References Cited

U.S. PATENT DOCUMENTS

| | | | |
|---|---|---|---|
| 1,168,257 | 1/1916 | Kennedy | 411/346 |
| 1,658,959 | 2/1928 | Zifferer | 411/342 |
| 3,127,807 | 4/1964 | Modrey | 411/340 |
| 3,175,452 | 3/1965 | Leitner | 411/340 |
| 4,043,245 | 8/1977 | Kaplan | 411/346 |
| 4,196,883 | 4/1980 | Einhorn et al. | 411/340 X |
| 4,318,651 | 3/1982 | Ragen | 411/342 |
| 4,432,683 | 2/1984 | Polos | 411/340 |

FOREIGN PATENT DOCUMENTS

| | | | |
|---|---|---|---|
| 1296883 | 6/1969 | Fed. Rep. of Germany | 411/346 |
| 17310 | 12/1915 | United Kingdom | 248/341 |
| 606902 | 8/1948 | United Kingdom | 411/345 |
| 1045984 | 10/1966 | United Kingdom | 411/340 |

Primary Examiner—Thomas J. Holko
Attorney, Agent, or Firm—Robert W. Fiddler

[57] ABSTRACT

An anchoring device for securing a member to a wall, particularly where there is access to only one surface of the wall. The anchoring device employs a toggle plate having a threaded opening therein, with the toggle plate dimensioned to fit into a hole through the wall to which it is desired to secure the member. An elongate engaging element coupleable to the member to be secured to the wall and dimensioned of a size to extend through the wall opening into the toggle plate opening is provided. At least a portion of the engaging element is flexible so that at least a part of the engaging element may be bent into a plane parallel to and in sufficiently close proximity to the toggle plate to permit the toggle plate and engaging element to be simultaneously inserted through the wall opening, with the toggle plate thereafter assuming a position perpendicular to the engaging element and subject to being drawn up on the engaging element against the wall.

5 Claims, 4 Drawing Figures

U.S. Patent  Feb. 18, 1986  4,570,891
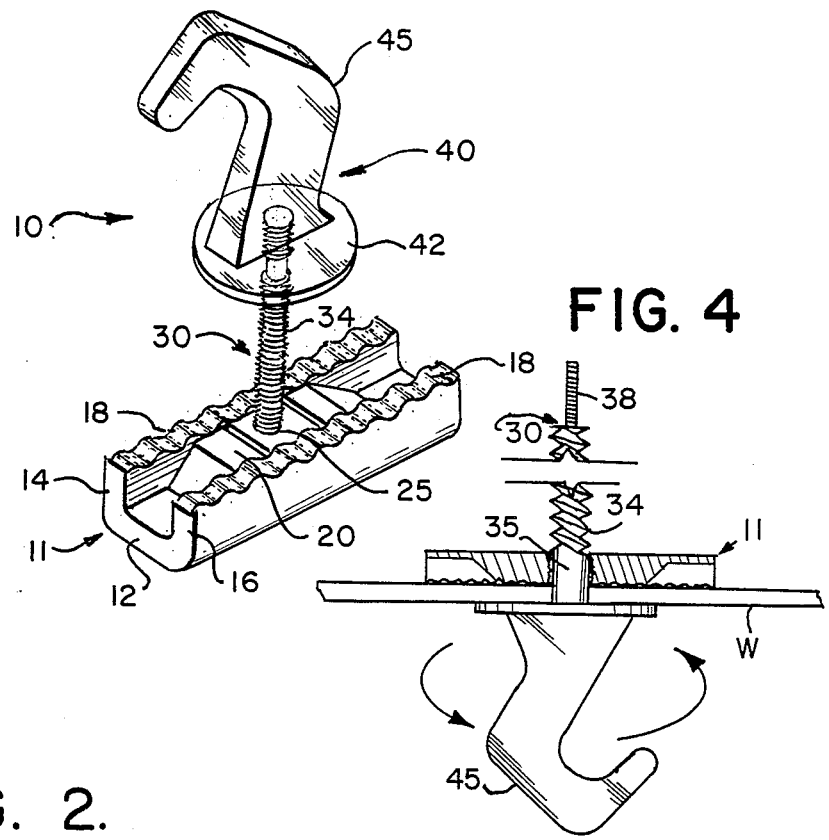
FIG. 1.
FIG. 4
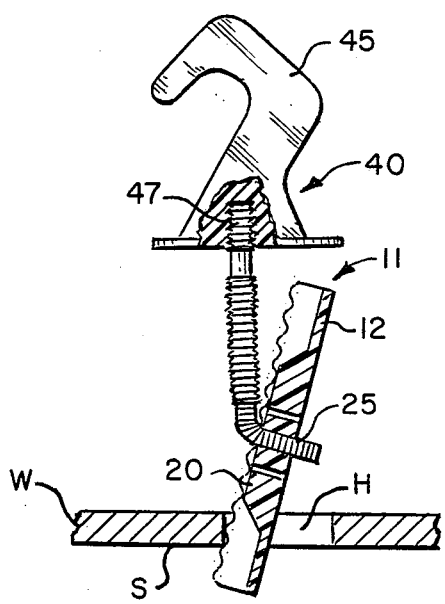
FIG. 2.
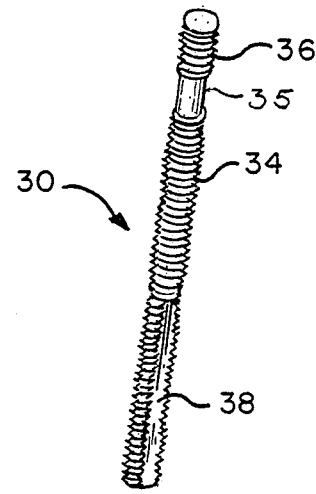
FIG. 3.

FLIP TOGGLE ANCHORING DEVICE

BACKGROUND OF THE INVENTION

This invention relates to the art of anchoring devices, and more particularly to an anchoring device for securing a member to a relatively frangible wall accessible from only one surface thereof to provide an anchor holding an engaging element coupled to the member to be supported on the wall in a secure fashion with the anchoring device acting to strengthen the wall at the point of attachment.

A variety of situations exist in which it is desired to secure a member to a wall which does not normally have the requisite strength to securely engage a bolt, screw, or friction pin. Thus, with plaster walls, or walls formed of plaster board, sheet rock, fiberglass, or the like compositions, and even with many wood panelled walls, it is found that a screw, bolt, or nail will often not be retained securely when driven into the wall to hang mirrors, wall brackets, plaques, and the large variety of different hardware items which it is often desired to secure to a wall.

Accordingly, a variety of anchor bolts have previously been evolved for use in fastening an article to a "blind" opening in a wall, that is, an opening accessible from only one side of the wall. These anchor bolts have generally been either of a toggle bolt type or an expansible type.

In the toggle bolt type, two spring separated wings are secured to a nut, with the wings adapted for folding parallel to each other along an axis perpendicular to the plane of the nut. A bolt is engaged with the nut and the wings are folded against the bolt and the bolt with the wings folded thereagainst is inserted into the blind wall opening. The wings, after passing through the wall, expand and the winged nut is pulled up tight against the blind side of the wall by the bolt. This structure requires the fabrication and assembly of a multiplicity of parts, wings, springs, connecting pins, etc., and entails rather involved assembly.

Another type of toggle bolt, such for example as shown by applicant's prior U.S. Pat. No. 4,043,245, employs a toggle plate dimensioned to fit through the wall opening. This toggle plate must be held in some fashion against the blind side of the wall until an engaging element such as a bolt may be inserted into engagement with the toggle plate requiring a relatively complex multipart structure.

With the expansible anchoring device, a variety of plug members have been evolved for insertion into the wall opening, with a screw member engaging the plug, and expanding same as the screw is threaded into the plug to effect anchoring with respect to the wall. These expansion devices though relatively simple in manufacture and use, exert an undesired pressure on the wall opening often tending to crumble the surrounding area as they expand.

BRIEF DESCRIPTION OF THE INVENTION

It is with the above considerations in mind that the present improved anchoring device has been evolved providing a relatively simple structure having minimal parts and acting to strengthen the wall area around the opening.

It is accordingly among the primary objects of the invention to provide an improved anchoring device for facilitating the securement of a member to a wall surface, with the device having a minimal number of parts, and relatively inexpensive to manufacture and assemble.

Another object of the invention is to provide a wall anchoring device which may be shipped as a single assembled unit.

A further object of the invention is to provide a wall anchoring device requiring minimal skills for use and subject to ready installation.

These and other objects of the invention which will become hereafter apparent are achieved by forming an anchoring device of an elongate toggle plate dimensioned to fit into an opening in a wall to which it is desired to secure a member. The toggle plate with a threaded opening therethrough is formed with a cross-section wider than it is high, so that upon insertion of the toggle plate through a circular wall opening, there will be a clearance between the wall opening and the wider surface of the toggle plate. An elongate engaging element coupleable to the member to be secured to the wall is provided dimensioned to extend through the wall opening into threaded engagement in the toggle plate opening, and of a size so that it may fit through the wall opening when lying along the toggle plate. The engaging element is formed with at least a portion thereof flexible so that it may be bent to lie in a plane parallel to and in sufficiently close proximity to the toggle plate to permit insertion of the toggle plate and engaging element through the wall opening when the engaging element is bent. A headed member is formed on the end of the engaging element remote from the toggle plate engaging end.

A feature of the invention resides in the formation of at least a part of the engaging element of a relatively resilient flexible material so that after engagement between the engaging element and the toggle plate, the engaging element may be bent at a point close to its entry into the toggle plate opening, so that the toggle plate and engaging element will lie in close proximity and may be inserted into the opening in the wall to which anchoring is desired.

Another feature of the invention resides in the formation of the flexible portion of the engaging element by reducing the cross-section of a portion thereof to provide desired flexibility.

Another feature of the invention resides in the possible formation of the engaging element of a composite material, such as relatively rigid steel and relatively flexible plastic material.

A further feature of the invention resides in the formation of the engaging element with a non-threaded portion to permit swivelling.

BRIEF DESCRIPTION OF THE DRAWINGS

The specific details of a preferred embodiment of the invention, and the best mode contemplated by applicant for carrying out the invention, and of the manner of making and using it will be described in clear, concise and exact terms in conjunction with the accompanying drawings, wherein:

FIG. 1 is a perspective view of an anchoring device made in accordance with the teachings of the invention showing a preferred embodiment illustrating the combination of the anchoring device with a hook member to be secured to a wall surface;

FIG. 2 is an elevational view with parts broken away showing the hook member and anchoring device, shown in FIG. 1, in the process of being secured to a wall; and FIG. 3 is a perspective view of the engaging element showing the flexible portion of reduced cross-section; and, FIG. 4 is a cross-section through the anchoring device when positioned for swiveling.

DESCRIPTION OF PREFERRED EMBODIMENT

Referring now more particularly to the drawings, where like numerals in the various FIGS. will be employed to designate like parts.

The anchoring device 10 as best seen in FIGS. 1 and 2, is formed with a toggle plate 11, which is broader than it is high in transverse cross-section as best seen to the left of FIG. 1. In the illustrated preferred embodiment, the toggle plate 11 is shown as formed of a channel-shaped configuration, with a base 12, relatively broader than the height of spaced channel legs 14 and 16. Serrations 18 are formed along the exposed ends of channel legs 14 and 16 for a purpose to be made hereafter more apparent. A thickened channel boss portion 20 is formed between legs 14 and 16, preferably of a height from the base 12 less than that of the legs 14 and 16. A threaded aperature 25 is extended through the boss 20 of the toggle plate channel 11.

An elongate engaging element 30 of a configuration and dimension such that it may fit through an opening in the wall to which it is desired to effect securement, and threaded through the toggle plate opening 25 to effect engagement with the toggle plate 11 is provided. In the illustrated embodiment, engaging element 30 is shown as formed of an elongate rod-like configuration. This rod-like element 30 is circular in cross-section along one end thereof (the upper end as viewed in FIG. 3). This circular in cross-section end is threaded along a central part 34 with a portion 35 preferably unthreaded, and with the free end 36 threaded. The flattened end 38 is also threaded.

A headed member 40 formed with a base 42 of a dimension larger in cross-section than the wall opening through which attachment is to be effected is secured to the end of engaging element 30, remote from the end engaged with the toggle plate 11. In the illustrated embodiment, this headed member is shown as a hook 45. Securement of the engaging member 30 to the headed member 40 is effected by means of a threaded connection 47, as seen in FIG. 2. However, it will be understood by those skilled in the art that any secure connection could be made.

OPERATION

The above disclosed structure is preferably fabricated of a plastic material subject to shaping by convention extrusion or molding processes. A polystyrene, polyvinyl, Teflon, acrylic, or the like has been found eminently suitable. The toggle plate may be formed of an extruded channel cut-off to desired length and provided with striations 18, or this plate may be so molded with a desired thickened center boss portion 20. Alternatively, the toggle plate may be formed of metal by conventional metal forming techniques. The engaging element 30 may similarly be formed of plastic or metal from a threaded cylindrical extrusion with reduced cross-section portion 38 formed by cutting away a part of the extrusion. Alternatively, the engaging element 30 may be molded with the reduced cross-section flexible portion 38. Additionally, the rigid portion of the engaging element may be formed of steel with a flexible portion formed by a flexible plastic material secured to the steel such as by a T-slot in the end of the steel portion receiving a T-shaped end of the flexible portion. Headed member 40 in the illustrated embodiment is also fabricated of plastic material by conventional plastic molding techniques, but may be formed of any other material as desired.

The above discussed components are assembled into the structure shown in FIGS. 1 and 2 and are then ready for use to effect securement of a member such as hook 45 to a wall W as seen in FIG. 2.

In use, the toggle plate is threaded to the relatively thinner flexible portion 38 of the engaging element 30, which is bent into an orientation such that the toggle plate is brought substantially parallel to the engaging element 30, as seen in FIG. 2, and pushed into the hole H in wall W until the toggle plate 11 is passed through to the blind side of the wall. At this time, the hook member is gripped manually and pulled away from the wall to draw the serrations 18 of toggle plate 11 up against the blind wall surface S. Thereafter, screwing the engaging element into the toggle plate brings the headed member 42 down against the wall surface to sandwich the wall between the toggle plate and the base 42 to securely hold the hook in desired position.

In the event that it is desired to provide a swivel supported hook 45, as where the hook 45 is to be mounted in a ceiling to support a plant which should be turned to face the light, the unthreaded portion 35 is selected of a length to permit the element to extend through the ceiling and the thickness of the boss 20, so that when the threaded portion is extended fully through the boss 20, the unthreaded portion 35 will freely swivel.

The above disclosure has been given by way of illustration and elucidation, and not by way of limitation, and it is desired to protect all embodiments of the herein disclosed inventive concept within the scope of the appended claims.

What is claimed is:

1. An anchoring device for securing a member to a wall surface, said device comprising; a channel shaped toggle plate dimensioned to fit into an opening in the wall to which it is desired to secure the member, said toggle plate having a threaded opening therethrough; a thickened boss around said toggle plate opening; serrations on the surface of said toggle plate arranged to engage the wall surface to which the member is to be secured; an elongate rod-like engaging element coupleable to the member to be secured to the wall, said engaging element dimensioned to extend through the wall opening into and through the toggle plate adjacent the toggle plate opening, said engaging element having a flattened cross-section flexible threaded portion adjacent a free end of said element engageable in the threaded opening in said toggle plate, the flexibility of said flexible portion being such as to permit ready bending of said flexible portion of said engaging element into a plane parallel to and in sufficiently close proximity to said toggle plate so as to fit through the wall opening with the toggle plate when said engaging element is so bent, said engaging element also having a threaded relatively rigid circular cross-section threaded portion adjacent the flexible portion, which rigid portion is also engageable in the threaded opening in said toggle plate; and said engaging element further including an unthreaded section on said engaging element adjacent said rigid portion and adjacent the end opposite the free end of the engaging element, said unthreaded section of a length equal to the thickness of the wall to which the member is to be secured plus the thickness of said boss; and a hook secured to the end opposite the free end of said engaging element, whereby, after said toggle plate is passed through the wall surface, said engaging element is rotated by said hook until said relatively rigid circular cross-section threaded portion of said engaging element passes through said threaded opening in said boss so that said unthreaded section is located in said threaded opening permitting said hook to swivel when mounted.

2. An anchoring device, as in claim 1, in which said toggle plate is formed of a channel arcuate in cross-section.

3. An anchoring device, as in claim 1, in which said toggle plate is broader in cross-section than it is high.

4. An anchoring device as in claim 1, in which the flexible portion of said engaging element is less than three fourths of the length of said engaging element.

5. An anchoring device as in claim 1, in which a headed member is formed on the end of said engaging element remote from the engaging element end extending through the wall opening.

* * * * *